United States Patent [19]
Hendel

[11] Patent Number: 5,575,223
[45] Date of Patent: Nov. 19, 1996

[54] FURNITURE KIT

[75] Inventor: Siegfried Hendel, Mannheim, Germany

[73] Assignee: Inntegra AG, Basel, Switzerland

[21] Appl. No.: 310,453

[22] Filed: Sep. 22, 1994

[30] Foreign Application Priority Data

Sep. 22, 1993 [CH] Switzerland ............... 2862/1993

[51] Int. Cl.⁶ ........................................... A47B 3/00
[52] U.S. Cl. ................... 108/193; 108/180; 108/107; 248/300
[58] Field of Search .................. 108/193, 192, 108/180, 106, 107, 110; 248/248, 300; 403/403

[56] References Cited

U.S. PATENT DOCUMENTS

| | | | |
|---|---|---|---|
| 617,164 | 1/1899 | Jewett | 248/248 |
| 1,225,525 | 5/1917 | Sweet | 248/300 X |
| 1,600,816 | 9/1926 | Harbert | 248/300 X |
| 2,102,082 | 12/1937 | Licke | 248/300 X |
| 2,792,193 | 5/1957 | Walsh | 248/300 X |
| 3,140,071 | 7/1964 | Lorentzen | 248/300 X |
| 4,083,458 | 4/1978 | Young, Jr. | 108/180 X |
| 4,463,510 | 8/1984 | Windish | 248/300 X |
| 4,589,792 | 5/1986 | Niziol | 403/403 X |
| 4,795,121 | 1/1989 | Comito | 248/300 X |
| 5,240,217 | 8/1993 | Lizakowski | 248/300 |
| 5,349,909 | 9/1994 | Smit et al. | 108/193 X |

*Primary Examiner*—Jose V. Chen
*Attorney, Agent, or Firm*—Anderson Kill & Olick P.C.

[57] ABSTRACT

The furniture kit consists of panel elements which are to be arranged alternatively vertically and horizontally and which have at least one row of holes along their longitudinal edges. The rows of holes of the panel elements are arranged and formed in such a way that the distance from hole center to hole center corresponds to the panel thickness d and that the first hole of the one ore more rows of holes is a distance d/2 from one of the broad sides. In addition, all panel elements have a width of (n3d−d/2), where n is any integer. The kit furthermore comprises connecting brackets for connecting the panel elements. These each have two limbs which are at right angles to one another and are provided with, respectively, eight and ten orifices which serve for receiving fixing screws. This furniture kit makes it possible to produce a very large number of possible combinations from a very small number of components, it also being possible in particular to connect the panel elements having a panel thickness d to panel elements whose panel thickness is not d but 3d/4, d/2 or d/4.

2 Claims, 2 Drawing Sheets

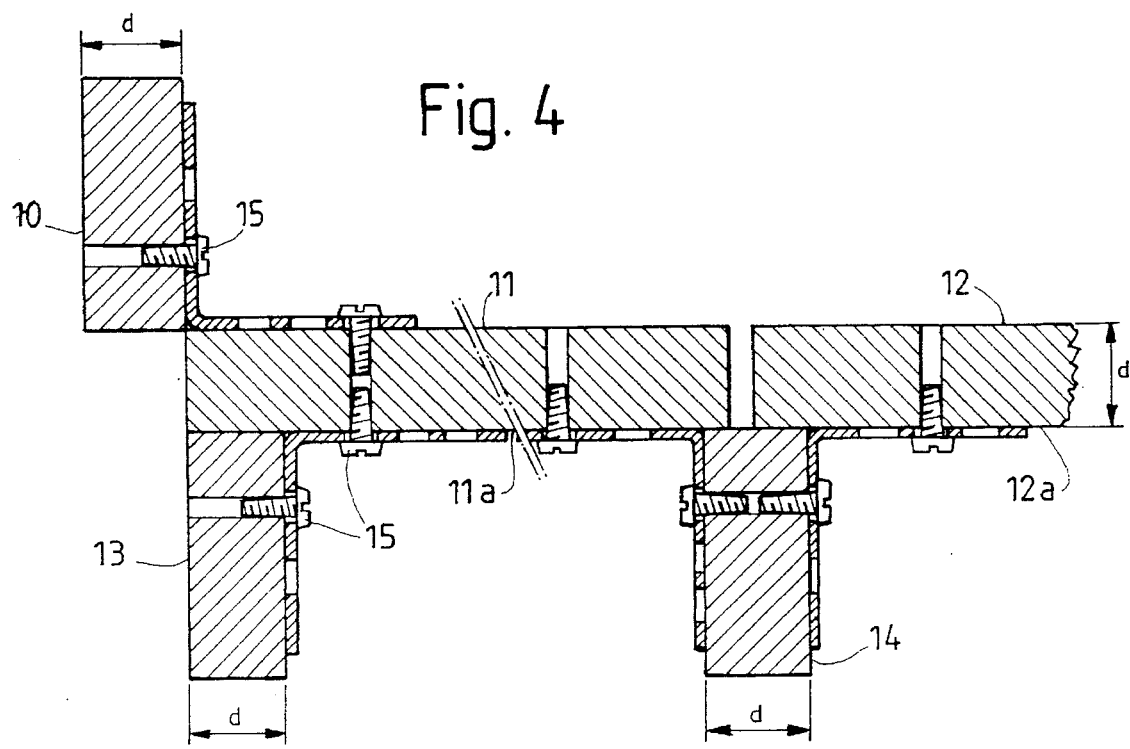
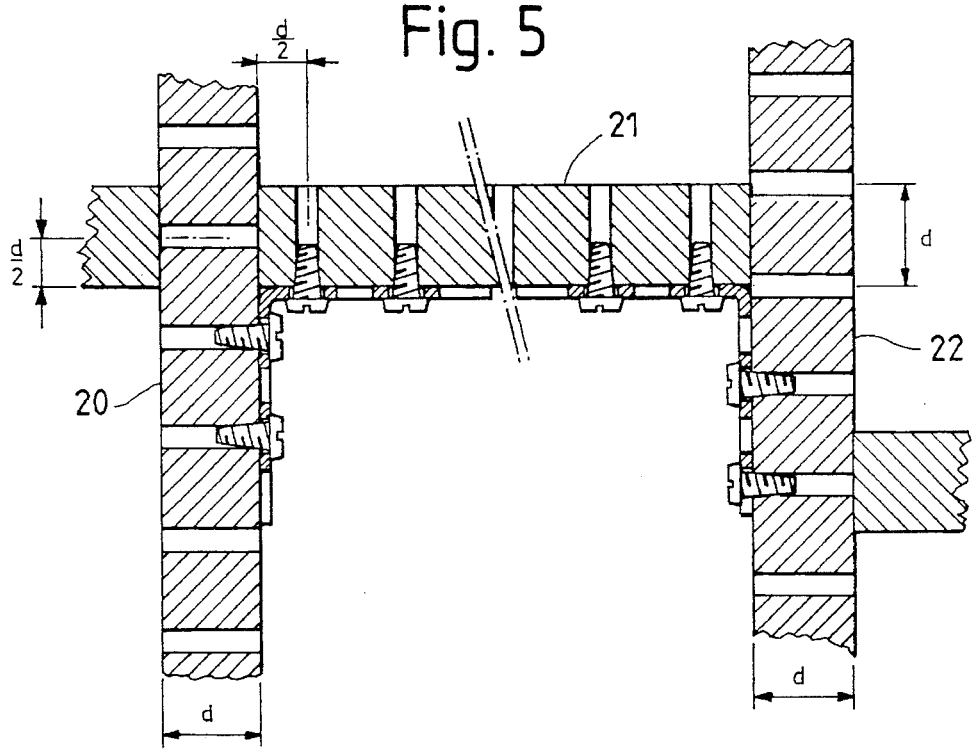

FURNITURE KIT

BACKGROUND OF THE INVENTION

1. Field of the Invention

The invention relates to a furniture kit consisting of panel elements to be arranged vertically and horizontally and connecting brackets for connecting the panel elements to one another. The connecting brackets have two limbs provided with a plurality of holes and all panel elements being provided, along their longitudinal edges, with at least one row of holes for the insertion of fixing screws.

2. Description of the Prior Art

German Offenlegungsschrift 2,644,397 discloses a furniture kit of the above-mentioned type. This known furniture kit Consists of panel elements of the same thickness which can be connected to one another and have a row of holes along each of their two longitudinal edges. Each row of holes is formed and arranged in such a way that the distance between the holes and the distance from the first and last hole of the row of holes to the broad side are equal to the panel thickness.

This furniture kit makes it possible to produce a piece of furniture from a relatively small number of different components. Thus, for example in the production of a box, the individual panel elements can be used directly as side or back panels and even as base or cover elements. In addition, in the method of construction disclosed in German Offenlegungsschrift 2,644,397, it is always ensured that the holes of the row of holes of two vertical panel elements are flush with one another, even when one of the two elements rests on a base element serving as the base of a piece of furniture and the other stands directly on the floor, so that horizontal intermediate elements, such as, for example, shelves, drawer rails and the like, can be directly mounted.

In this furniture kit, two panel elements in each case are connected to one another at right angles by means of connecting brackets. Thus, panel elements can be connected to one another in such a way that they make contact with one another only along their longitudinal edges or broad edges or that the end face of one panel element rests completely against the front surface of another panel element, which front surface forms the inner surface of a piece of furniture.

The above-mentioned furniture kit has the disadvantage that the panel elements can be connected to one another only two different ways, so that this kit is only of limited use for the production of furniture which can be expanded as desired. A further disadvantage of this furniture kit is that all panel elements which are used for the production of a piece of furniture must be of the same thickness. Thus, for example, the panel elements forming the back panel or a door element of a box must have the same thickness as the other panel parts, resulting in various disadvantages, such as an unnecessary increase in the weight of the empty box and/or a considerable load on the hinges used for supporting the door elements. It should be noted here that, in order to remedy the above-mentioned disadvantages, it is known per se that it is possible to produce pieces of furniture in which the back panel and/or the door elements are thinner than the side panels or base elements.

SUMMARY OF THE INVENTION

Starting from the above-mentioned furniture kit, it is the object of the present invention to propose a furniture kit which permits more than only two possible combinations for connecting the panel elements and in which all panel elements need not be of the same thickness. It should be possible to assemble furniture which can be expanded as desired, such as, for example, wall cabinets and shelf units, using a range of panel elements of the same type and standard connecting brackets, it being possible to use any desired panel element of the range both as a side panel, base panel or cover panel and as a door element, back panel or intermediate panel.

This object is achieved, according to the invention, by a furniture kit consisting of panel elements to be arranged at right angles to one another and connecting brackets which have two limbs provided with a plurality of holes, at least some of the panel elements having a panel thickness d and all panel elements being provided, along their longitudinal edges, with at least one row of holes for the insertion of fixing screws, and the one or more rows of holes being arranged and formed in such a way that the distance from hole center to hole center corresponds to the above-mentioned thickness d and that the first hole of the one or more rows of holes is a distance d/2 from one of the broad sides. All panel elements have a width of (n3d–d/2), where n is any integer, so that the panel width may be, for example, 2.5 d, 5.5 d, 8.5 d, 11.5 d or 14.5 d.

Advantageous embodiments form the subject of the dependent claim.

BRIEF DESCRIPTION OF THE DRAWINGS

The invention is illustrated in detail below with reference to the drawings.

In the drawings,

FIG. 4 shows a cross-section through a panel connection, consisting of five panel elements, and FIG. 5 shows a longitudinal section through a part of a shelf unit consisting of a plurality of panel elements.

DESCRIPTION OF THE PREFERRED EMBODIMENTS

Figure 1:
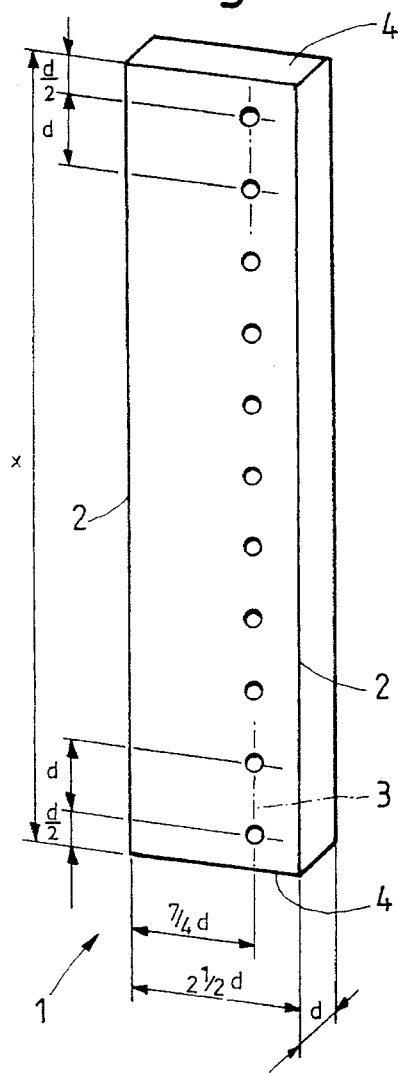
FIG. 1 shows a plan view of a panel element.

The panel element shown in FIG. 1 and designated as a whole by 1 is provided, along its two longitudinal edges 2, with a row 3 of holes for the insertion of fixing screws, the distance from hole center to hole center being constant and the panel thickness corresponding to d. The panel element 1 has a width of 2.5 d and a total length of x, which is an integral multiple of the hole spacing or of the thickness d of the element 1. The row 3 of holes is arranged in such a way that the distance to one longitudinal edge is 7d/4 and that the first and last holes of the row 3 of holes are each a distance d/2 from the broad side 4.

Figure 2:
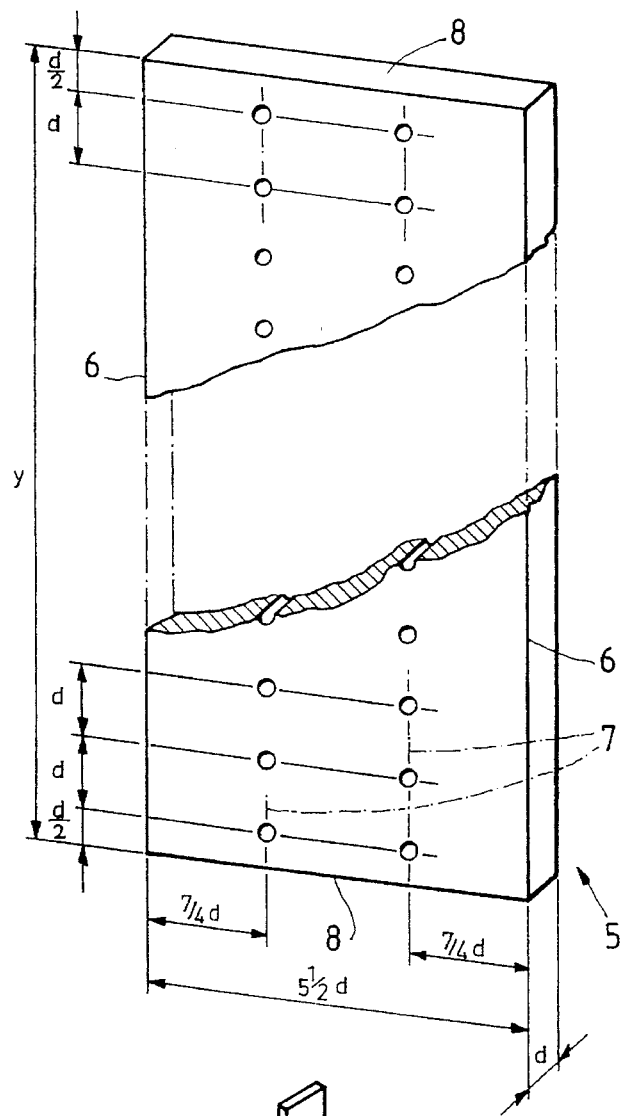
FIG. 2 shows a plan view of another panel element.

The panel element 5 shown in FIG. 2 has a width of 5.5 d and has, along its two longitudinal edges 6, two rows 7 of holes, each of which rows is a distance 7d/4 from one of the two longitudinal edges 6. As in the case of the panel element 1 shown in FIG. 1, the distance between every two holes of a row of holes is d and the distance from the first and last hole of each row to the broad side is 8 d/2. Finally, the panel element 5 has a total length of y, which—as in the case of the total length of the panel element 1 —is an integral multiple of the thickness d of the element.

Figure 3:
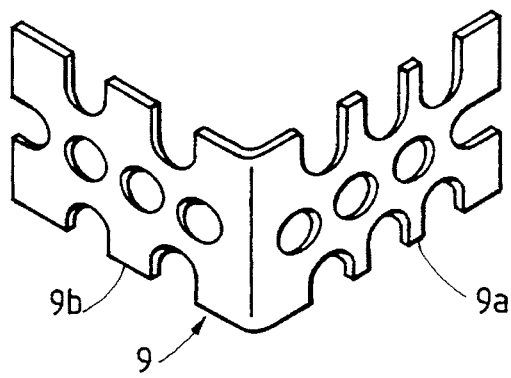
FIG. 3 shows a view of a connecting bracket.

The connecting bracket 9 shown in FIG. 3 is used for connecting panel elements of the type according to the invention. The first limb 9a of the connecting bracket 9 is provided with ten orifices and the second limb 9b with eight orifices. The latter are arranged symmetrically with respect to a symmetry line running at right angles to the bracket edge and serve for receiving fixing screws of the same thickness. Four orifices are present along the symmetry line of each of the two limbs 9a, 9b, the distance between the centers of the orifices and the bracket edge being d/2, d, 3d/2 and 2d. The other orifices are in the form of recesses which start from the edges parallel to the symmetry line, the distance between the bracket edge and the centers of the recesses being 3d/4, 5d/4 and 7d/4 in the case of the first limb 9a, but 3d/4 and 3d/2 in the case of the second limb 9b.

FIG. 4 shows five panel elements 10, 11, 12, 13 and 14 connected to one another at the longitudinal edges. Here, the elements 10, 13 and 14 correspond to the panel element shown in FIG. 1, and the elements 11 and 12 correspond to a panel element having a width of, for example, 11.5 d. In addition, all panel elements have the same panel thickness d. Finally, connecting brackets 9 are used for connecting the panel elements 10–14. Said connecting brackets are detachably fastened to the panel elements by means of fixing screws 15 in a known manner. As is evident from FIG. 4, panel elements according to the invention can be connected at right angles to one another in four different ways. Thus, the panel elements 10, 11 and 13 are connected to one another in such a way that the panel elements 10 and 11 are in contact with one another only at their longitudinal edges and the end face of the panel element 13 rests completely against the front surface 11a of the panel element 11. The two other methods of connection are shown on the right-hand side of FIG. 4. Here, the panel element 14 is connected to the panel elements 11 and 12 in such a way that ¼ of the end face of the panel element 14 rests against the front surface 11a of the element 11 and ¾ of the end face against the front surface 12a of the element 12.

The part of a shelf unit shown in longitudinal section in FIG. 5 shows three panel elements 20, 21 and 22 connected to one another. These each have a panel thickness d and are connected to one another by means of connecting brackets 9. FIG. 5 shows that—although the holes of the rows of holes of the two parallel panel elements 20 and 22 opposite one another are not flush with one another—the horizontal panel element 21 serving, for example, as a shelf can be fastened to the two vertical panel elements 21 and 26 by means of the connecting brackets 9.

As already mentioned, the furniture kit disclosed in German Offenlegungsschrift 2,644,397 has the disadvantage that all panel elements which can be used for the production of a piece of furniture have the same panel thickness. In this connection, it should be noted that, according to the present invention, panel elements having a panel thickness d can also be connected to elements whose panel thickness is 3d/4, d/2 or even d/4. The latter differ only in their panel thickness from the panel elements defined and described as above, i.e. have a panel width of (n3d −d/2), where n is any integer, and at least one row of holes which runs along their longitudinal edges and is arranged and formed in such a way that the distance from hole center to hole center corresponds to the above-mentioned thickness d and the first hole of the one or more rows of holes is a distance d/2 from one of the broad sides.

Finally, it should be pointed out here that the panel elements described with reference to FIGS. 1 to 5 are only a selection of possible embodiments of the invention and can be changed in various respects.

Thus, for example, it is also possible to provide the panel elements additionally with at least one row of holes, running at right angles to their longitudinal edges, for the insertion of fixing screws, the first and last holes of this row of holes each being a distance 7d/4 from the longitudinal edge and belonging to a row of holes running along the longitudinal edges.

What is claimed is:

1. A furniture kit, comprising:

a plurality of panel elements including first panel elements having a thickness of d and second panel elements having a thickness equal one of 3d/4, d/2 and ¾, the panel elements of the plurality of panel elements having a width of (n3d–d/2), where n is an integer, and all of the panel elements of the plurality of panel elements being provided, along longitudinal edges thereof, with at least one row of holes for receiving fixing screws, with a distance between centers of adjacent holes corresponding to the thickness d and with a first hole of the row of holes being spaced from an adjacent end side a distance equal d/2; and a plurality of connecting brackets having each first and second limbs extending at a right angle to each other and having, respectively, ten and eight fixing screw receiving openings arranged symmetrically relative to a line of symmetry extending at a right angle to a bracket edge;

wherein four of the openings of the first limb and four of the openings of the second limb have centers thereof lying on the symmetry line and spaced from the bracket edge a distance equal, respectively, d/2, d, 3d/2, and 2d, and wherein remaining six openings of the first limb and four openings of the second limb are formed as recesses evenly distributed along opposite edges of the first and second limbs, respectively, which extend parallel to the symmetry line, with centers of recesses of the first limb being spaced from the bracket edge a distance 3d/4, 5 d/4 and 7d/4, and centers of recesses of the second limb being spaced from the bracket edge a distance equal 3d/4 and 3d/2.

2. A furniture kit as set forth in claim 1, wherein a panel element of the plurality of panel elements has a width equal to at least 5.5d and has at least one row of fixing screw receiving holes extending at a right angle to the longitudinal edges thereof, wherein first and last holes of the row of holes extending at right angles to the longitudinal edges of the panel element are spaced from a respective longitudinal edge a distance equal 7 d/4, and wherein the first and last holes belong, respectively, to rows of holes provided along the longitudinal edges of the panel element.

* * * * *